United States Patent [19]

Ehrhart

[11] 4,081,946
[45] Apr. 4, 1978

[54] HEADER SUSPENSION AND LIFT MEANS

[75] Inventor: Philip J. Ehrhart, Rothsville, Pa.

[73] Assignee: Sperry Rand Corporation, New Holland, Pa.

[21] Appl. No.: 746,561

[22] Filed: Dec. 1, 1976

[51] Int. Cl.² .......................................... A01D 47/00
[52] U.S. Cl. ..................................... 56/14.4; 56/15.8
[58] Field of Search ..................... 56/1, DIG. 1, 14.4, 56/208, 15.8, 11.9

[56] References Cited

U.S. PATENT DOCUMENTS

| 3,363,407 | 1/1968 | Drummond | 56/15.8 |
|---|---|---|---|
| 3,550,363 | 12/1970 | Halls et al. | 56/11.9 |
| 3,608,286 | 9/1971 | Lausch et al. | 56/14.4 |
| 3,672,132 | 6/1972 | Scarnato et al. | 56/1 |
| 3,797,207 | 3/1974 | Sawyer et al. | 56/1 |
| 3,919,831 | 11/1975 | Halls et al. | 56/228 |
| 3,958,399 | 5/1976 | Schoeneberger | 56/15.8 |

*Primary Examiner*—Russell R. Kinsey
*Attorney, Agent, or Firm*—John B. Mitchell; Frank A. Seemar; Joseph A. Brown

[57] ABSTRACT

A crop harvesting machine has a crop harvesting header, a mobile frame and improved header suspension and lift means. The frame includes an upper transverse elongated member and a pair of spaced apart side members fixed to the upper member proximate its opposite ends and extending downwardly therefrom. A pair of wheel arms extend rearwardly from the respective side frame members and are mounted to respective lower portions thereof for vertical swinging movement about a generally horizontal transversely-extending axis. Each wheel arm has a ground-engaging wheel rotatably mounted thereto. The improved header suspension and lift means includes an upper link pivotally interconnecting an upper portion of the header to the upper frame member and a pair of elongated lower members respectively extending forwardly of the wheel arms. The lower members are pivotally mounted proximate the respective forward ends of the wheel arms and have portions extending rearwardly and within the path of swinging movement of the wheel arms. Lift means in the form of a pair of hydraulic cylinders are mounted between the frame and respective wheel arms and actuatable for causing swinging movement of the wheel arms and the lower members therewith so as to effect upward lifting of the frame and header from a lower field operating position to a raised transport position.

12 Claims, 6 Drawing Figures

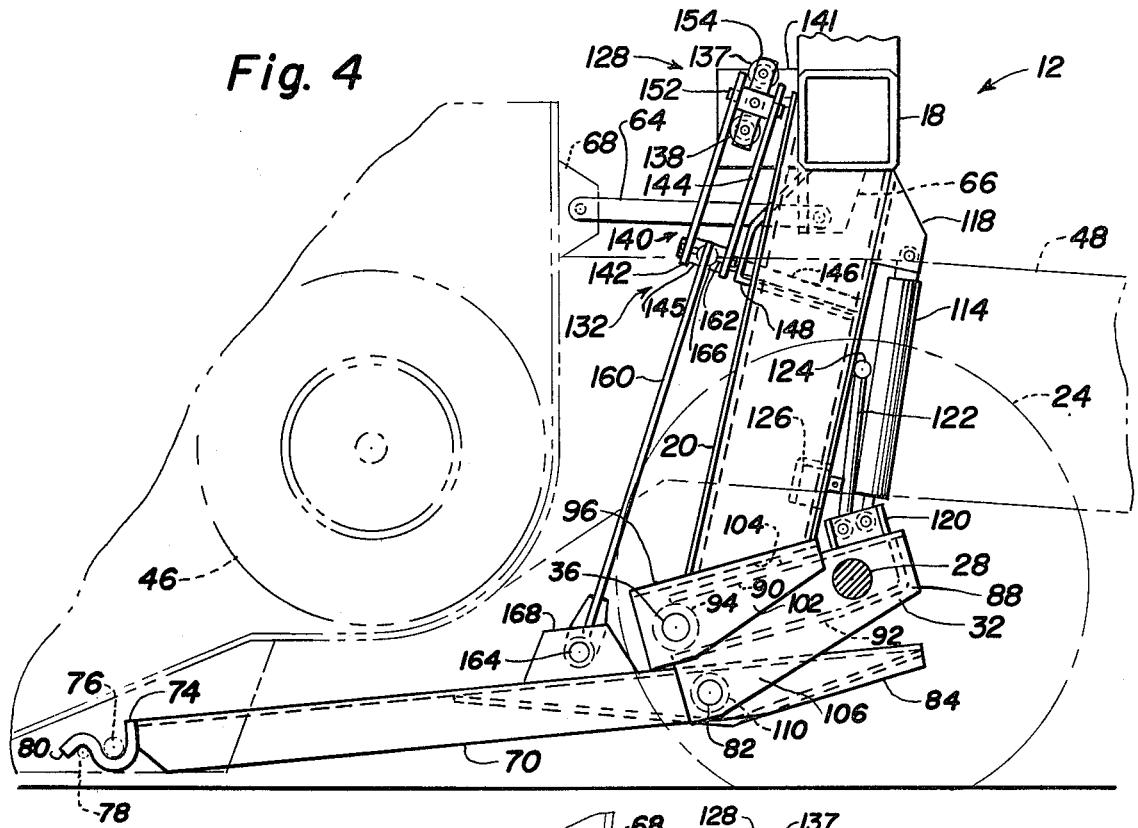
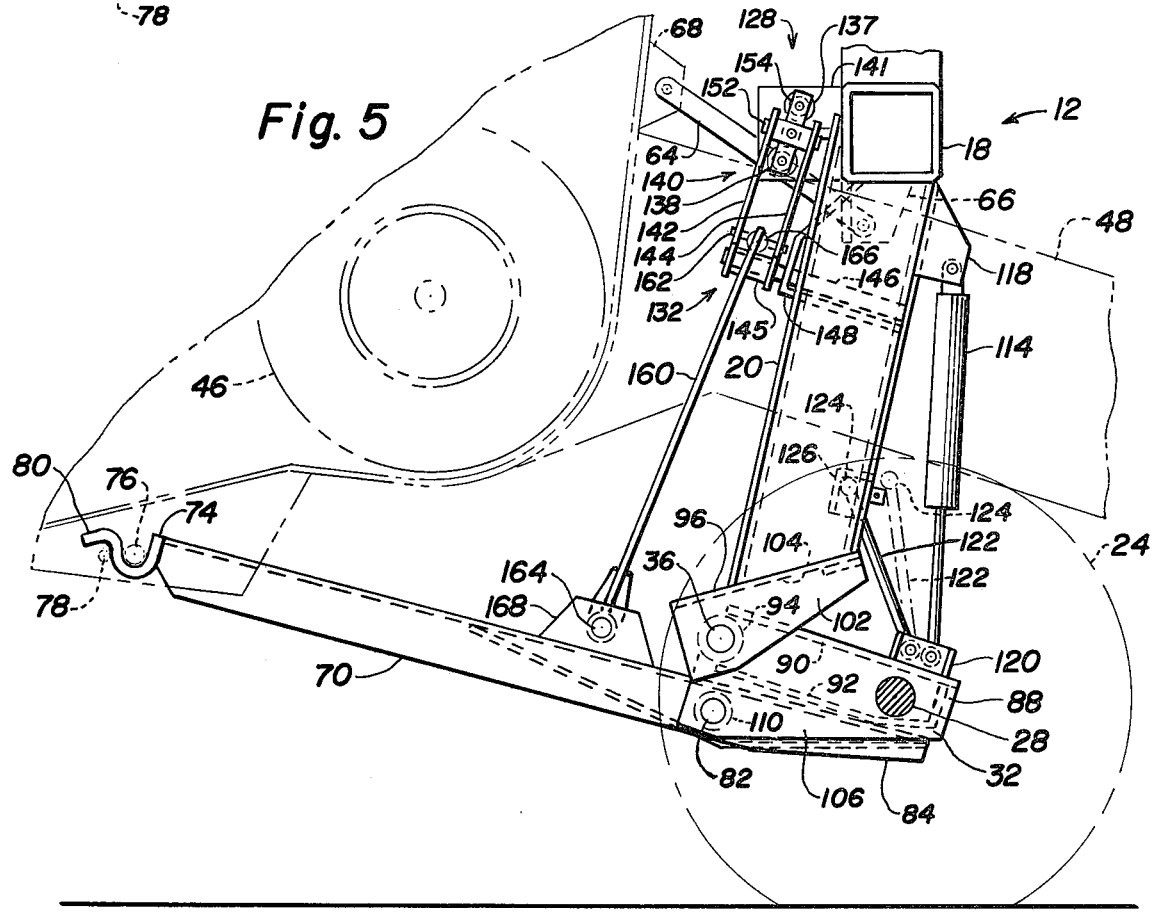

HEADER SUSPENSION AND LIFT MEANS

CROSS REFERENCE TO RELATED APPLICATION

Reference is hereby made to the following co-pending U.S. application dealing with related subject matter and assigned to the assignee of the present invention:

1. "Header Suspension and Lift Means" by Bryant F. Webb, U.S. Ser. No. 757,724, filed Jan. 7, 1977.

BACKGROUND OF THE INVENTION

1. Field of the Invention

The present invention relates generally to a crop harvesting machine and, more particularly, is concerned with improved header suspension and lift means on the harvesting machine.

2. Description of the Prior Art

Prior art crop harvesting machines have a mobile frame and a crop harvesting header suspended on the frame for vertical movement relative thereto. Some machines have ground-engaging wheels which are rotatably mounted on wheel arms which are vertically swingably mounted to the frame to raise and lower the frame while the header is also being raised and lowered between transport and field operating positions. Such machines are disclosed and illustrated in U.S. Pat. Nos. 3,517,491, 3,608,286, 3,754,383, 3,797,207, and 3,828,532.

While these prior art machines are generally satisfactory for their intended purposes, improvement in suspension and lifting of the header is desirable to enhance the over-all performance and versatility of the machine both during field operation and road transporting thereof.

SUMMARY OF THE INVENTION

The improved header suspension and lift means of the present invention maximizes the height to which the header is lifted above the field during lifting of the machine frame to road transport position from field operating position which advantageously provides additional clearance between the field and the header, while the ability of the header to move vertically in response to changing field contour during harvesting operation is retained.

Accordingly, the present invention broadly relates to a crop harvesting machine having a mobile frame adapted to move across a field in a forward direction and a crop harvesting header suspended from the machine by improved means. A pair of wheel arms extend rearwardly from the frame, generally parallel to the forward direction, and are mounted proximate their respective forward ends to the frame at laterally spaced apart locations for vertical pivotal or swinging movement relative to the frame about a generally horizontal axis. A ground-engaging wheel is rotatably mounted to each of the wheel arms rearwardly of the pivotal axis thereof. Lift means in the form of a pair of hydraulic cylinders are mounted between the frame and wheel arms and actuatable to cause swinging movement thereof to effect upward lifting of the frame relative to the field between a lower field operating position and a raised transport position.

The improved header suspension and lift means for disposing the header in a harvesting position adjacent the field when the frame is at its lower field operating position and for lifting the header upwardly relative to the field during effectuation of upward lifting of the frame, includes upper means pivotally interconnecting an upper portion of the header to the frame and a pair of elongated lower members respectively extending forwardly from the wheel arms and being interconnected at their forward ends to a lower portion of the header. The lower suspension members are mounted at locations proximate the respective forward ends of the wheel arms for vertical pivotal movement and have portions extending rearwardly of the mounting locations and within the path of swinging movement of the wheel arms such that, during movement of the wheel arms to effect upward lifting of the frame relative to the field, the rearward extending lower member portions are engaged by the wheel arms and the lower members are thereby moved with said wheel arms to lift the header relative to the field.

In the preferred embodiment of the header suspension and lift means, the wheel arms respectively include mounting portions depending from their forward ends and the elongated lower members are respectively mounted to the depending mounting portions of the wheel arms about a generally horizontal axis which is disposed below and extends generally parallel to the pivotal axis of the wheel arms. In a modified embodiment of the improvement, the elongated lower suspension members are respectively mounted for vertical pivotal movement about the pivotal axis of the wheel arms.

Further, the frame includes an upper elongated member extending transversely to the forward direction and a pair of spaced apart side members respectively fixed to the upper transverse frame member proximate its opposite ends and extending downwardly therefrom. The wheel arms are vertically aligned with the side frame members and the forward end portions of the wheel arms underlie and are mounted to respective lower portions of the side frame members for vertical swinging movement relative thereto. The wheel arms respectively abut against the bottoms of the lower side member portions when the frame is disposed at the lower field operating position. The lower suspension members are also vertically aligned with the respective wheel arms and side frame members.

The advantages and attainments of the improvement provided by the present invention will become apparent to those skilled in the art upon a reading of the following detailed description when taken in conjunction with the drawings in which there is shown and described illustrative embodiments of the invention.

BRIEF DESCRIPTION OF THE DRAWINGS

In the course of the following detailed description reference will be frequently made to the attached drawings in which:

FIG. 4 is an enlarged fragmentary left side elevational view on a somewhat larger scale than those of FIGS. 2 and 3 as seen from along line 4—4 of FIG. 2, showing the header and frame of the machine in the lower field operating position;

FIG. 5 is a left side elevational view similar to that of FIG. 4, but showing the header and frame in a raised transport position.

DETAILED DESCRIPTION OF THE INVENTION

In the following description, right hand and left hand references are determined by standing at the rear of the machine and facing in the direction of forward travel. Also, in the following description, it is to be understood that such terms as "foward," "left," "upwardly," etc., are words of convenience and are not to be construed as limiting terms.

IN GENERAL

Figure 1:
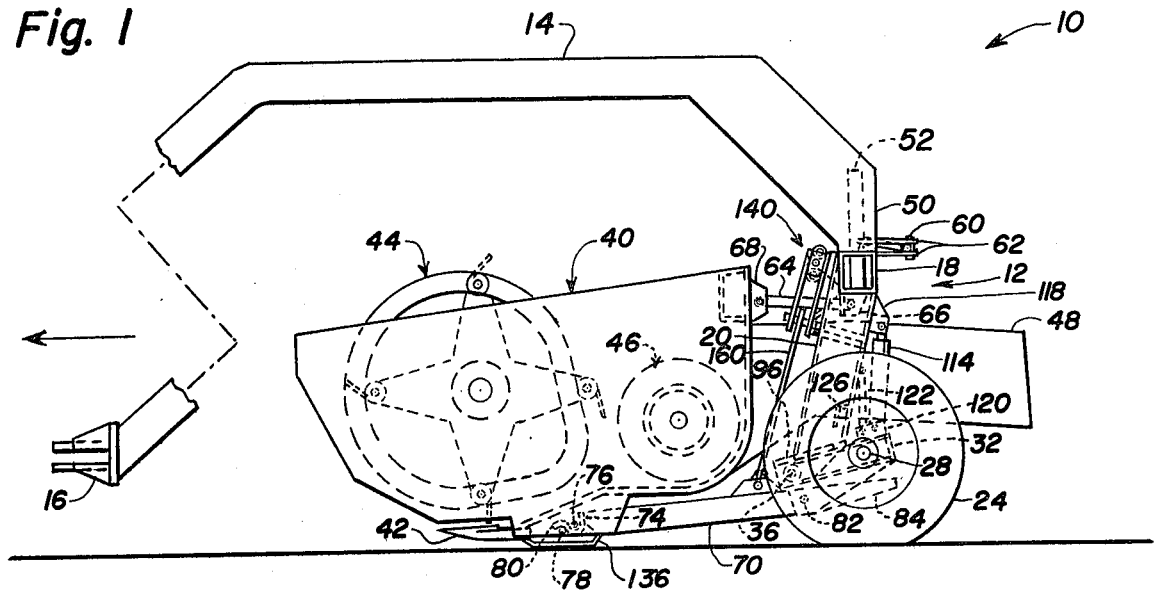
FIG. 1 is a left side elevational view of the preferred embodiment of a crop harvesting machine incorporating the principles of the present invention, showing the machine header and frame in a lowered, field operating position with a portion of the longitudinally-extending draft member broken away.
Figure 2:
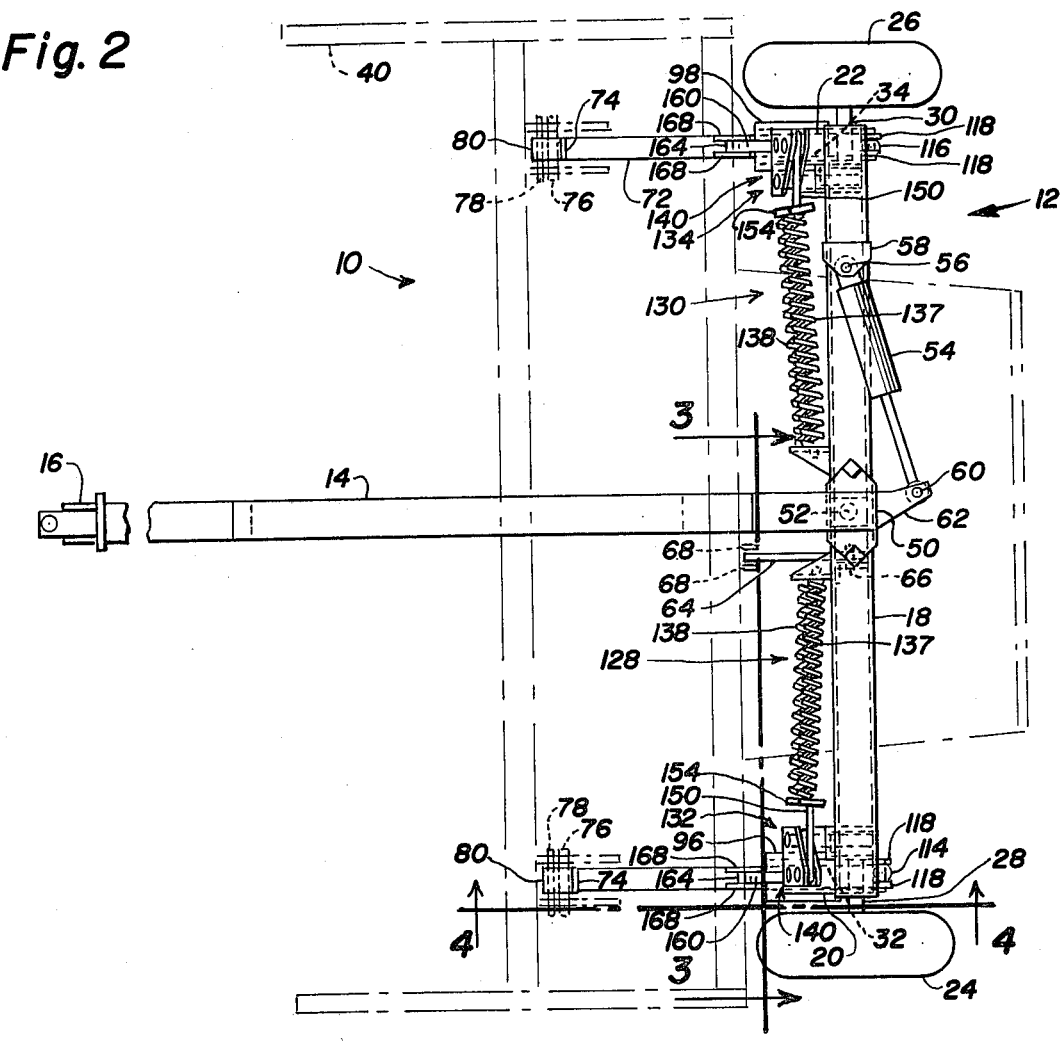
FIG. 2 is a plan view of the machine on the same scale as in FIG. 1, with the machine header shown in broken line form.

Referring now to the drawings, and particularly to FIGS. 1 and 2, there is shown a crop harvesting machine being in the form of a windrower, indicated generally by numeral 10, incorporating the preferred embodiment of the improvement of the present invention (the left side of the machine being shown in FIG. 1 when one is standing to the rear of the machine and facing in the direction of forward travel as represented by the arrow in FIG. 1).

The machine 10 is a pull-type unit having a mobile frame, generally indicated by numeral 12, and a draft member 14 pivotally attached at its rear end to the frame 12 and including a clevis 16 at its forward end for pivotal attachment to a tractor or other towing vehicle (not shown) for towing the frame 12 forwardly across a field.

The frame 12 includes an upper elongated tubular member 18 which extends transversely to the forward direction and a pair of left and right spaced apart side members 20,22 which are fixed to the respective opposite ends of the tubular member 18 and similarly extend in an inclined manner downwardly and forwardly therefrom. The draft member 14 is pivotally mounted at its rear end to the elongated upper transverse tubular frame member 18 at a central location therealong.

The frame 12 is made mobile by a pair of left and right spaced apart ground wheels 24,26 being rotatably mounted on corresponding left and right spindles 28,30 which extend outwardly and transversely from and are respectively fixed on corresponding rear end portions of left and right wheel arms 32,34. The respective wheel arms 32,34, which extend generally parallel to the forward direction and rearwardly of the frame 12, are swingably or pivotally mounted at their forward end portions by pins 36 (only the left one being shown in FIG. 2) to corresponding lower end portions of the side frame members 20,22. The wheels 24,26 rotate about a common horizontal axis, being formed by the axially aligned spindles 28,30, which is located rearwardly of and generally extends parallel to the common horizontal pivotal axis of wheel arms 32,34, being formed by the axially aligned pivot pins 36. By vertically swingably moving the wheel arms 32,34 about the common axis of the wheels 24,26, the frame 12 may be elevated or lowered relative to the field.

An elongated header 40 is disposed forwardly of the frame 12 and extends transversely to the forward direction beneath the draft member 14 for harvesting a wide swath of crop material from the field as the mobile frame 12 advances forwardly behind the towing tractor. The header 40 includes conventional crop treating or harvesting elements, such as a cutterbar 42, a reel 44 and a converging auger 46, being driven through suitable mechanical driveline components (not shown) by a suitable source of power (not shown), such as hydraulic power. The standing crop material is severed from the field and delivered rearwardly through a rear opening in the header 40 by these elements as the machine 10 is towed forwardly across the field. The crop material passing through the rear opening of the header 40 is received by conditioner rolls (not shown) operatively mounted in the forward portion of a housing 47 fixed to the central rear side of the header 40 and then deposited back on the field after passing under a windrow forming structure 48 which is fixed on and extends rearwardly of the housing 47 and under the transverse tubular frame member 18.

As described hereinabove, the draft member 14 is pivotally mounted at its rear end 50 to the elongated tubular frame member 18 at a central location therealong. Such central pivotal mounting location facilitates disposing of the machine 10 anywhere between lateral positions offset from the right and left sides of the towing tractor for harvesting crop located at either side of the tractor. An upright post 52, being fixed on and extending upwardly from a central location along the upper side of the tubular frame member 18, mounts the rear end 50 of the draft member 14 for pivotal movement about a generally vertical axis. The draft member 14 extends upwardly and forwardly from the post 52, then forwardly in spaced relationship about the header 40 and finally forwardly and downwardly to its forward end which has clevis 16 attached thereon. The clevis 16 is adapted for pivotal connection to the tractor drawbar (not shown) for securing the machine 10 to the tractor while at the same time allowing relative pivotal movement between the draft member 14 and the tractor about a generally vertical axis.

The draft member 14 may be selectively pivoted relative to the frame 12 of the machine 10 through actuation of a hydraulic cylinder 54 being coupled between the tubular frame member 18 and the rear end 50 of the draft member 14. The hydraulic cylinder 54, being of the double acting type, is pivotally anchored at its cylinder end at 56 to a bracket 58 fixed on the tubular frame member 18 at a location remote from the rear end 50 of the draft member 14. The piston rod end of the cylinder 54 is pivotally connected at 60 to and between the rear ends of a pair of tabs 62 fixed to and protruding rearwardly from the rear end 50 of the draft member 14.

In FIGS. 1 and 2, the draft member 14 extends generally parallel to the forward direction which disposes the machine 10 in position for road transporting behind the tractor. When the cylinder 54 is extended from its position in FIG. 2 through selected actuation of suitable hydraulic controls (not shown) as the machine 10 is moved forwardly, the draft member 14 swings clockwise, as seen in FIG. 2, about post 52 and the mobile frame 12 and header 40 move to a location offset outwardly from the rear left side of the tractor for harvesting crop located at the left side of the tractor. When the cylinder 54 is retracted from its position in FIG. 2 as the machine 10 is moved forwardly, the draft member 14 swings counterclockwise about post 52 and the mobile frame 12 and header 40 move to a location offset outwardly from the rear right side of the tractor for harvesting crop located at the right side of the tractor.

PREFERRED EMBODIMENT OF THE IMPROVED HEADER SUSPENSION AND LIFT MEANS

Figure 3:
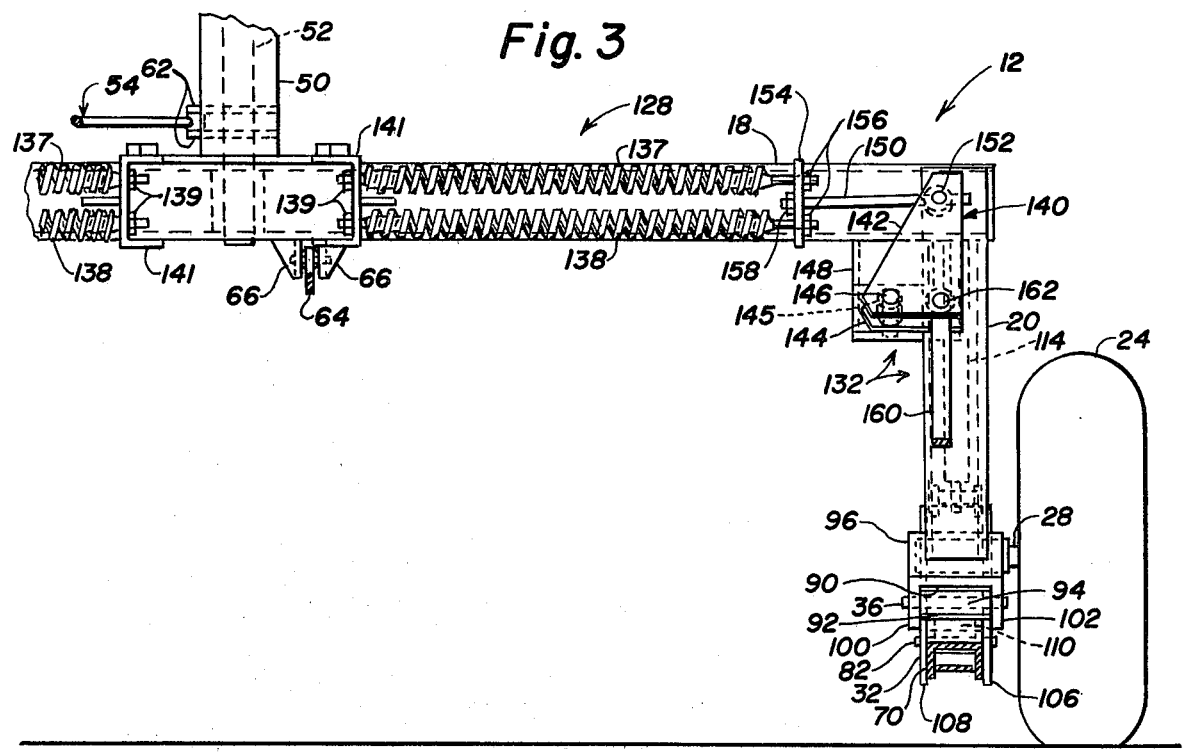
FIG. 3 is an enlarged fragmentary front elevational view of approximately the left half of the mobile frame of the machine as seen from along line 3—3 of FIG. 2.

As seen in FIGS. 1 and 2, and in more detail in FIGS. 3 through 5, there is provided improved means for suspending the header 40 from the frame 12 so as to dispose the header 40 in a harvesting position adjacent the field when the frame 12 is at a lower field operating position (FIGS. 1 and 4) and for lifting the header 40 upwardly relative to the field during effectuation of upward lifting of the frame relative to the field to the road transport position (FIG. 5).

The suspension means includes an upper stabilizing bar 64, being centrally located, extending between and pivotally interconnecting brackets 66 and 68 respectively fixed to and extending forwardly of a central portion of the upper transverse tubular frame member 18 and fixed to and extending rearwardly of an upper central portion of the header 40 and a pair of elongated lower left and right members 70,72 respectively extending forwardly from the wheel arms 32,34 and being interconnected at their forward ends to a lower portion of the header 40.

For pivotally connecting the forward ends of the lower members 70,72 to the header 40, each forward end of the lower members 70,72 includes an arcuately-shaped saddle bracket 74 which receives one of a pair of cylindrical bearings 76 mounted near opposite lower sides of the header 40. Each corresponding saddle bracket 74 and bearing 76 is retained in seated relationship by a removable pin 78 inserted under a forwardly-protruding and downwardly-curved lip 80 formed on each of the saddle brackets 74. For a more complete understanding of such connecting arrangement, attention is directed to U.S. Pat. No. 3,958,399. A more detailed description of such connecting arrangement need not be presented herein for a complete understanding of the present invention.

The lower elongated members 70,72 are mounted at the respective locations of left and right pivot pins 82 (only the left one being seen in FIGS. 1 and 3 through 5) proximate the respective forward ends of the wheel arms 32,34 for vertical pivotal movement and have portions 84 (only the left portion being seen in FIGS. 1 and 3 through 5) which extend rearwardly of the mounting locations and within the path of swinging movement of the wheel arms 32,34.

Each of the wheel arms 32,34 is comprised by a channel-shaped member formed by inner and outer vertical side walls 86,88 and top wall 90 which extends between and interconnect the side walls 86,88. A reinforcing strip 92 extends between and interconnects the side walls 86,88 so as to form a bottom wall of the wheel arm. Each of the spindles 28,30 extend through and are fixed to the side walls 86,88 of the respective wheel arms 32,34 near the rearward ends thereof. At the forward end of each of the wheel arms 32,34 is a sleeve 94 which is disposed between the forward edges of the top and bottom walls 90,92, extends between and is fixed to the inner and outer side walls 86,88, and is aligned with holes formed through the latter. The lower end portions of the side frame members 20,22 respectively include downwardly and forwardly inclined channel members 96,98 which open downwardly and nestably receive the respective wheel arms 32,34 with pivot pins 36 extending through the respective sleeves 94 of the wheel arms 32,34 and through holes formed through the forward downwardly-protruding portions of side walls 100,102 of the channel members 96,98 and aligned with the sleeves 94. In such arrangement, the left and right wheel arms 32,34 are respectively vertically aligned with and disposed below the lower end portions of the left and right side frame members 20,22 with the top walls 90 of the wheel arms 32,34 abutting or bottoming out against upper walls 104 of the channel members 96,98 of the side frame members 20,22 when the frame 12 is at the lower field operating position, as seen in FIGS. 1 and 4.

The side walls 86,88 of each of the wheel arms 32,34 extend downwardly past the bottom wall 92 thereof so as to form mounting portions 106,108 depending from the forward end portion of the respective wheel arm. The mounting portions 106,108 respectively receive the rearward portions 84 of the lower members 70,72 in a nesting relationship and have holes formed therethrough which align with a transverse sleeve 110 fixed within the structure of each of the lower suspension members 70,72. Rearward extending portions 84 of the lower members 70,72 project rearwardly of the transverse sleeves 110 (only the left sleeve being seen in FIGS. 3 through 5). Pivot pins 82 are respectively received through the holes in mounting portions 106,108 and through the sleeves 110 so as to pivotally mount the lower members 70,72 about a common horizontal axis which is disposed below the common horizontal pivotal axis of the wheel arms 32,34 and extends parallel thereto as well as to the common rotational axis of the wheels 24,26.

Means in the form of a pair of left and right hydraulic cylinders 114,116 are provided on the machines and actuatable through manipulation of suitable hydraulic controls (not shown) for causing swinging movement of the respective wheel arms 32,34 and the lower members 70,72 so as to effect upward lifting of the frame 12 and header 40 from the lower field operating position of FIGS. 1 and 4 to the raised transport position of FIG. 5. The cylinder end of each of the hydraulic cylinders 114,116 is pivotally anchored between a pair of brackets 118 fixed on each of the opposite ends of the upper transverse member 18 and projecting rearwardly therefrom. The piston rod end of each of the cylinders is pivotally connected to an upright tab 120 fixed on the top wall 90 of the respective one of the wheel arm 32,34 at the rear end thereof.

As seen in FIG. 4, when the hydraulic cylinders 114,116 (only the left cylinder 114 being shown) are retracted, the wheel arms 32,34 are bottomed out against the bottom of the side frame members 20,22 and the rearward portions 84 of the lower header suspension member 70,72 are displaced below the respective wheel arms 32,34, with the frame 12 and header 40 thereby disposed at their lower field operating position.

As the hydraulic cylinders 114,116 are extended, the wheel arms 32,34 swing downwardly relative to the side frame members 20,22 (clockwise as viewed in FIG. 4) and concurrently swing upwardly relative to the wheels 24,26 (also clockwise as viewed in FIG. 4) which effectuates upward lifting of the upper transverse member 18 and side members 20,22 of the frame 12 relative to the field to the raised transport position of FIG. 5. Soon after the cylinders 114,116 begin to extend and the frame 12 begins to lift, the pivotal movement of the wheel arms 32,34, being relative to the lower suspension members 70,72, brings the upper surfaces of the rearward extending lower member portions 84 into contact with the respective bottom walls 92 of the wheel arms 32,34. Once contact is made, the lower members 70,72 move with the respective wheel arms 32,34 in a clockwise manner about the common horizontal pivotal axis of the wheel arms defined by pivot pins 36. Because the portions of the elongated lower members 70,72 extending forwardly from the wheel arms 32,34 have a substantially greater length than that of the wheel arms, the header 40 is lifted upwardly from the field through a distance greater than that through which the frame 12 is lifted upon extension of the cylinders 114,116. Consequently, during lifting of the frame 12 relative to the field, the header 40 is not only lifted relative to the field, but also lifted relative to the frame 12. The height of the header 40 above the field in the raised transport position of FIG. 5, being attained through the combined lift of the frame 12 and header 40, advantageously provides additional ground clearance for the windrow forming structure 48 such that the structure 48 will more readily now be able to clear windrowed crop lying on the field during transporting of the machine 10 from a field, as well as clear other ground obstructions while transporting the machine 10.

Once the raised position of FIG. 5 is reached, a transport lock link 122 pivotally mounted on and extending upwardly from the upright tab 120 on each of the wheel arms 32,34 may be moved from the broken line position to solid line position of FIG. 5 wherein its upper end 124 will underlie and be confined by a bracket 126 fixed to the respective one of the side frame members 20,22. Once the links 122 are in locking position (as seen in solid line form in FIG. 5, with only the left link being shown), the pressure in each of the cylinders 114,116 may be relieved. The links 122 may be moved to their outer unlocking positions (as seen in broken line form in FIG. 5), when it is desired to initiate lowering of the machine 10 back down to its field operating position, after the cylinders 114,116 are again pressurized to fully extend the same. Once the links 122 have been manually moved to their unlocking positions, de-pressurization of the cylinders 114,116 allows the cylinders to retract and the frame 12 and therewith the header 40 to descend back to the lower field operating position due to the force of gravity.

The header 40 suspended from the frame 12 by the upper central stabilizing bar 64 and lower left and right elongated members 70,72 is also adapted for vertical flotation on the field by a pair of left and right generally horizontally disposed yieldable resilient means 128,130 and a pair of left and right motion transmitting linkage assemblies 132,134 which support most of the weight of the header 40 when the machine 10 is in its lower field operating position. The remaining weight of the header 40 is supported on the field by a pair of ground engaging skid shoes 136 (only the left one being shown in FIG. 1) fixed to the lower outer portions of the header 40.

As clearly seen in FIGS. 2 and 3, each yieldable resilient means 128,130 is in the form of upper and lower generally parallel tension springs 137,138 being respectively mounted at their inner ends by nuts 139 to brackets 141 which are attached to and project forwardly of the upper transverse frame member 18 on either side of a central portion of the member 18. The left and right pairs of springs 137,138 extend laterally in opposite directions along the frame member 18 toward opposite ends thereof.

Each left and right motion transmitting linkage assembly 132,134 includes a lever 140 being formed by a pair of generally right-triangular shaped plates 142,144 fixed in fore-and-aft spaced apart relationship to one another by a sleeve 145 located at the inner, lower corner portions thereof. The sleeve 145 is rotatably journalled on a shaft 146 which defines a generally fore-and-aft extending axis and is fixed to and extends forwardly of a corner bracket 148, in turn, being fixed to and extending inwardly and downwardly from, respectively, the respective side frame member 20,22 and corresponding opposite end of the transverse frame member 18 (only the left corner bracket 148 being seen in FIG. 3). By such pivotal mounting relationship of the left and right levers 140, the outer vertically-extending edge portions thereof are generally vertically aligned above and with the respective left and right lower suspension members 70,72. The outer, upper corner portions of each of the left and right levers 140 are respectively pivotally interconnected to the outer ends of the left and right pairs of springs 136,138 by a link 150 being pivotally mounted at its outer end by pin 152 extending between the plates 142,144 of each of the levers 140. The link 150 extends inwardly therefrom to an inner end which projects through a central opening in a vertical plate 154 to which the outer ends of the respective pairs of springs 136,138 are attached by nuts 156. The inner end of the link 150 is anchored to the plate 154 by a nut 158.

Each left and right motion transmitting linkage assembly 132,134 further includes a link 160 which extends between and pivotally interconnects at pins 162,164, rspectively, the outer lower corner portions of each of the left and right levers 140 and an intermediate portion of each of the corresponding left and right lower suspension members 70,72 located forwardly of the wheel arms 32,34.

The upper end of each of the left and right links 160 includes a ball joint type connection 166 with the pivot pin 162 which is rotatably journaled to and between the plates 142,144 of the lever 140, as seen in FIGS. 4 and 5. The ball joint 166 allows for universal pivoting of the link 160 relative to the lever 140 so as to accommodate both the pivotal motion of the corresponding one of the levers 140 and one of the lower members 70,72 about their respective axis which extend in generally orthogonal relationship to one another. The lower end of each of the left and right links 160 is pivotally connected by pin 164 between a pair of upstanding spaced apart tabs 168 fixed along the intermediate portion of each of the lower members 70,72.

It will be understood that by adjusting nuts 158, the tension of each of the pairs of corresponding springs 137,138 may be varied thereby providing adjustment of the header flotation characteristics provided by the springs. It will also be seen that the spaced relationship between the rearward extending portions 84 of the lower members 70,72 and the wheel arms 32,34 when the machine 10 is in its lower operating position allow a certain amount of downward flotational movement of the header 40 relative to the frame 12 when a depression in the field is encountered by the header 40. It is clear that the pivotal mounting relationship of the lower members 70,72 to the respective wheel arms 32,34 would allow for upward flotational movement of the header 40 relative to the frame 12 irrespective of whether the rearward extending lower member portions 84 are spaced below the respective wheel arms 32,34 or in contact therewith.

MODIFIED EMBODIMENT OF THE IMPROVED HEADER SUSPENSION AND LIFT MEANS

In the following description of the modified embodiment of the improved header suspension and lift means with reference to FIG. 6, the parts identical to those previously described in connection with the preferred embodiment are identified with the same reference numerals, while those parts being modified somewhat in structure from those previously described are identified with the same reference numerals followed by a prime.

Figure 6:
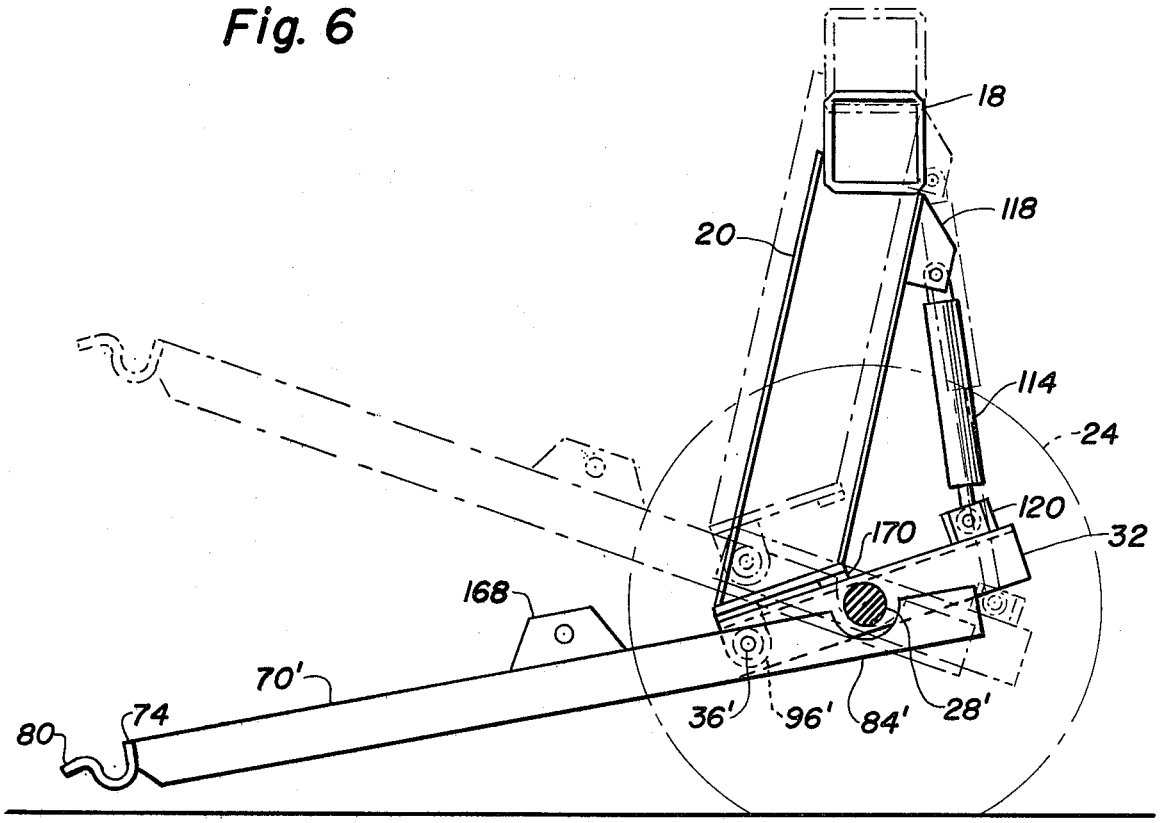
FIG. 6 is a left side elevational view similar to those of FIGS. 4 and 5, but showing another embodiment incorporating the principles of the present invention.

The basic change in the modified embodiment of FIG. 6 from the preferred embodiment of FIGS. 4 and 5 is that the lower suspension members (only the left one 70' being shown in FIG. 6) are respectively mounted for vertical pivotal movement about the common horizontal axis of the wheel arms (only the left wheel arm 32' being shown in FIG. 6) being defined by pivot pin 36'. Other minor modifications relate to the particular structure of the wheel arms, the nestable relationship of the wheel arms within the rearward extending lower member portions 84', the location of the wheel spindles intermediately along the wheel arms and a mounting bracket 96' and stop 170 on the bottom side of the respective side frame members 20,22 in place of the channel members 96,98. Otherwise, the cooperative relationships between the wheel arms and lower suspension members during lifting of the frame 12 and header 40 are substantially the same as described hereinbefore.

It is thought that the improvement provided by the present invention and many of its attendant advantages will be understood from the foregoing description and it will be apparent that various changes may be made in the form, construction and arrangement of the parts thereof described without departing from the spirit and scope of the invention or sacrificing all of its material advantages, the forms hereinbefore described being merely exemplary embodiments thereof.

Having thus described the invention, what is claimed is:

1. In a crop harvesting machine having a crop harvesting header, a frame, means adapting said frame for movement in a forward direction across a field, said adapting means including a pair of wheel arms extending rearwardly from said frame, generally parallel to the forward direction and mounted proximate their respective forward ends to said frame at laterally spaced apart locations for vertical pivotal movement relative to said frame about a generally horizontal axis and a ground-engaging wheel rotatably mounted on each of said wheel arms at a location spaced rearwardly of the pivotal axis of said wheel arms, and lift means mounted on said frame and being actuatable to cause pivotal movement of said wheel arms relative to said frame and said wheels to effect upward lifting of said frame relative to the field between a lower field operating position and a raised transport position, an improved means for suspending said header from said frame so as to dispose said header in a harvesting position adjacent the field when said frame is at its lower field operating position and for lifting said header upwardly relative to said field during effectuation of upward lifting of said frame, comprising:

upper means pivotally interconnecting an upper portion of said header to said frame; and a pair of elongated lower members respectively extending forwardly from said wheel arms and being interconnected at their forward ends to a lower portion of said header, said lower members being mounted at locations proximate said respective forward ends of said wheel arms for vertical pivotal movement and having portions extending rearwardly of said mounting locations and within the path of pivotal movement of said wheel arms such that, during movement of said wheel arms to effect upward lifting of said frame relative to the field, said rearward extending portions of said lower members are engaged by said wheel arms and said lower members are thereby moved with said wheel arms to lift said header relative to the field.

2. The machine as recited in claim 1, wherein:

said wheel arms respectively include mounting portions depending from their forward ends; and said elongated lower members are respectively mounted to said depending mounting portions of said wheel arms about a generally horizontal axis which is disposed below and extends generally parallel to said pivotal axis of said wheel arms.

3. The machine as recited in claim 1, wherein said rearward extending portions of said lower members are spaced below said respective wheel arms when said frame is disposed at its lower position.

4. The machine as recited in claim 1, wherein portions of said elongated lower members extending fowardly from said wheel arms have a substantially greater length than that of said wheel arms such that said header will be lifted upwardly from the field through a distance greater than that through which said frame is lifted upon actuation of said lift means.

5. The machine as recited in claim 1, wherein said elongated lower members are respectively mounted for vertical pivotal movement about said pivotal axis of said wheel arms.

6. A crop harvesting machine, comprising:

a crop harvesting header;

a mobile frame adapted for movement in a forward direction across a field, said frame including an upper elongated member extending transversely to the forward direction, a pair of spaced apart side members respectively fixed to said upper transverse member proximate its opposite ends and extending downwardly therefrom, a pair of wheel arms extending rearwardly from said respective side frame members and generally parallel to the forward direction, said wheel arms being vertically aligned with said side frame members and at said forward end portions of said wheel arms underlying and mounted to respective lower portions of said side members for vertical pivotal movement relative thereto about a generally horizontal transversely-extending axis, and a ground-engaging wheel rotatably mounted to each of said wheel arms at a location spaced rearwardly of said pivotal axis of said wheel arms;

means for suspending said header from said mobile frame including upper means pivotally interconnecting an upper portion of said header to said upper member of said frame and a pair of elongated lower members respectively vertically aligned with said side frame members and said wheel arms and extending forwardly from said wheel arms, said lower members pivotally interconnecting a lower portion of said header to said wheel arms at locations proximate said respective forward end portions of said wheel arms; and lift means mounted on said frame and being actuatable for causing pivotal movement of said wheel arms and movement of said lower members therewith so as to effect upward lifting of said frame and said header from a lower field operating position to a raised transport position.

7. The machine as recited in claim 6, wherein said wheel arms respectively abut against the bottoms of said lower side member portions when said frame is disposed at said lower field operating position.

8. The machine as recited in claim 6, further comprising:

a pair of generally horizontally disposed yieldable resilient means for providing vertical flotation of said header with respect to the field, said pair of resilient means being respectively mounted at their inner ends to said upper transverse frame member proximate a central portion of the same and extending laterally in opposite directions toward opposite ends of said upper member; and a pair of motion transmitting linkage assemblies respectively pivotally mounted proximate the opposite ends of said upper transverse frame member and interconnecting respective outer ends of said pair of resilient means with portions of said lower members of said header suspending means which extend forwardly from said wheel arms.

9. The machine as recited in claim 6, further comprising a draft member attached at its rear end to said upper transverse frame member for pivotal movement about a generally vertical axis and extending forwardly therefrom above said header to a forward end adapted for attachment to a towing tractor.

10. The machine as recited in claim 6, wherein said lower members of said header suspending means respectively include portions which extend rearwardly of said locations of pivotal connection of said lower members to said respective forward end portions of said wheel arms, said rearward extending lower member portions being disposed within the path of pivotal movement of said wheel arms such that, during movement of said wheel arms to effect upward lifting of said frame relative to the field, said rearward extending lower member portions are respectively engaged by said wheel arms and said lower members are thereby moved with said wheel arms to lift said header relative to the field.

11. The machine as recited in claim 10, wherein:

said wheel arms respectively include mounting portions depending from their forward end portions; and said lower members of said header suspending means are respectively pivotally connected to said depending mounting portions of said wheel arms about a generally horizontal axis which is disposed below and extends generally parallel to said pivotal axis of said wheel arms.

12. The machine as recited in claim 10, wherein said lower members of said header suspending means are respectively connected to said wheel arms for vertical pivotal movement about said pivotal axis of said wheel arms.

* * * * *